I. DREYFUS.
Machine for Compressing and Purifying Air.
No. 200,901. Patented March 5, 1878.
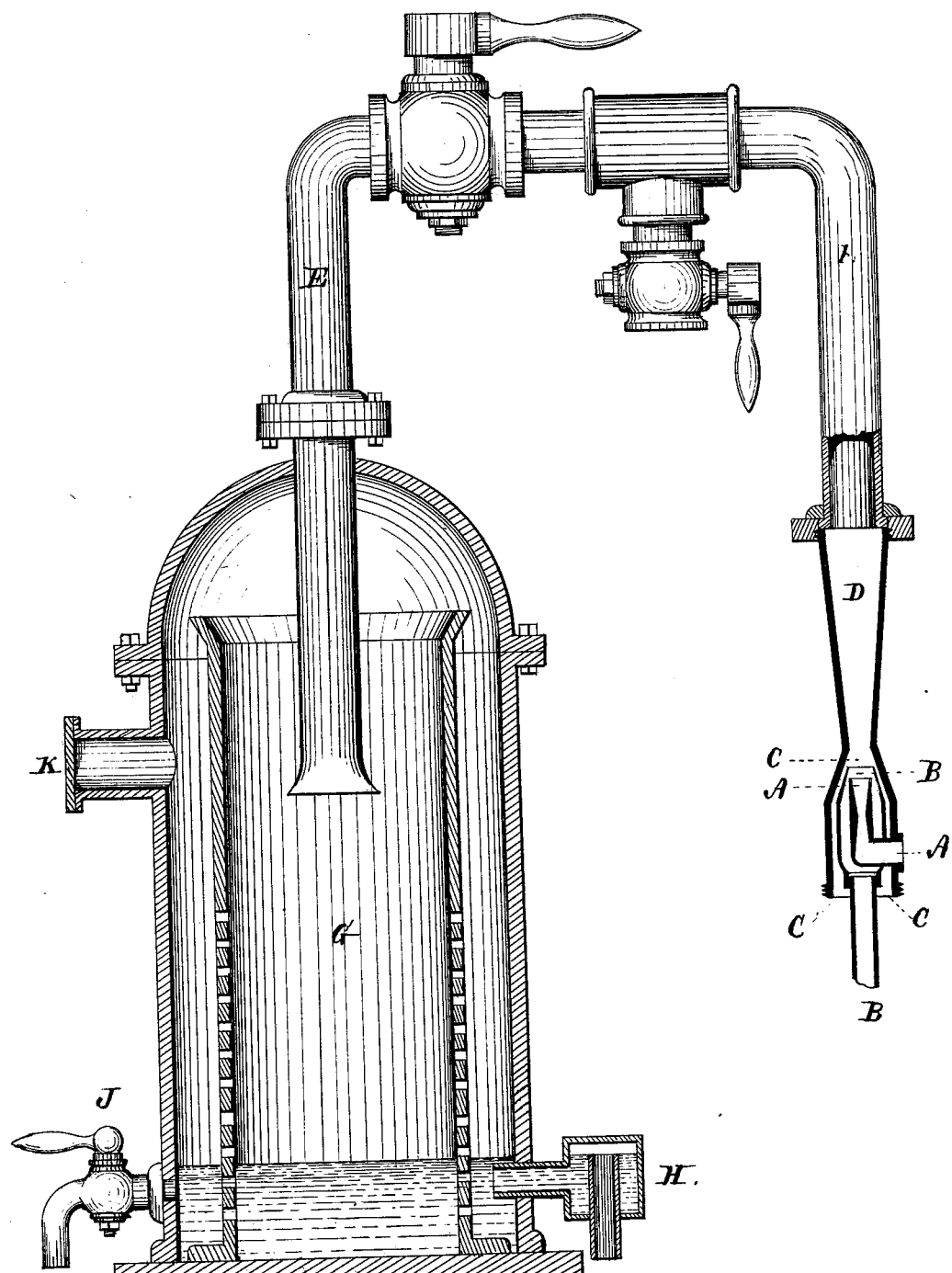

UNITED STATES PATENT OFFICE.

ISIDORE DREYFUS, OF NEW YORK, N. Y.

IMPROVEMENT IN MACHINES FOR COMPRESSING AND PURIFYING AIR.

Specification forming part of Letters Patent No. 200,901, dated March 5, 1878; application filed January 14, 1878.

*To all whom it may concern:*

Be it known that I, ISIDORE DREYFUS, of the city and county of New York, and State of New York, have invented a new and useful Improvement in Apparatus for Compressing and Purifying Air and other gases by means of steam and water, which improvement is fully set forth in the following specification:

The object of my invention is twofold, and the apparatus subject-matter of this patent may be employed for the accomplishment of either or both objects.

The first object and use of my invention consists in the employment, such as hereinafter described, of steam to carry air or other fixed gases into a condensing or compressing chamber. A jet or stream of water, being carried along and brought into contact with the air or gases, by the same instrumentality deprives said air or gases of all moisture by condensation of the steam or vapor that may be present. The air or gases may then be drawn from the chamber at a suitable outlet, or it or they may be allowed to collect in a separate condenser or collector, and thence drawn as may be needed, for any purpose whatsoever.

The second object and use of my invention consists in purifying atmospheric air, or in separating therefrom noxious gases, vapors, or effluvia, which may be generated by heat or otherwise in various industries, such as in chemical, smelting, rendering, rectifying, distilling, or other works and places, by the employment of steam to convey such gases or vapors into a condensing-chamber, where, on being brought into contact with water or other liquid, they will be either condensed and dissolved in or mechanically mixed with the water or other liquid, and be precipitated or absorbed by chemical or mechanical combination and thus deodorize and purify atmospheric air from gases or vapors calculated to render it foul.

The water or liquid may separately be collected and purified by chemical processes, or it may be wasted, according to circumstances.

To enable others to make and use my said invention, and the manner in which the same is or may be carried into effect, I shall now proceed to describe an apparatus constructed in accordance with my said invention, referring to the drawing, which represents an elevation, partly in section, of the same.

The apparatus may be said to consist of two parts, united by means of tubing or pipes, and suitable cocks to establish or cut off communication between the said parts. One part of the apparatus is constructed on the Giffard-injector principle; and consists of a chamber containing concentric annuli, each having a separate inlet, and all uniting or discharging into said chamber, which, for this purpose, I call "the combining-chamber." The central inlet A, being connected with a steam-generator, terminates in a nozzle, through which steam is caused to issue in the direction imparted by it. Surrounding the steam-nozzle is a second nozzle, B, communicating or having its inlet connected with air or a gas receiver or generator. The steam-jet at the nozzle A, by its velocity, produces a vacuum or partial vacuum at the mouth of the nozzle B, which vacuum will induce the air or gas from the receiver to combine with or be carried along by the steam. Surrounding the last nozzle is a chamber, C, formed to leave an annular space around the nozzle B. The upper part of said chamber is contracted to constitute, as it were, a third nozzle above the second. The three nozzles, it will be seen, are thus arranged successively one above the other, commencing with the steam-nozzle, which is the lowest in order. The last chamber is connected at its inlet with a reservoir of water or suitable liquid. In the forward motion of the body of gas or air and steam combined, and in passing the contracted portion or ring of the third nozzle, the water or liquid will be forced up, and, combining with the gas or air and steam, the following will take place: The steam becomes instantly condensed, and the vacuum at the nozzle is thereby rendered the more perfect, while the air is expelled and driven forward, and any gases or vapors or other matters capable of being dissolved in or absorbed by water will be thus incorporated with and carried along by the body of water into the combining-chamber D, and thence through the pipe E into a receiver, G. The latter may be of any suitable construction to collect and compress or condense the air, gases, or vapors carried into it by the stream of water, and to discharge at a suitable pressure the excess of water or liquid accumulated therein. Provision should also be made for emptying the chamber when not in use, and for the connection with it of air or gas conveying means.

In the drawing I have shown such a receiver of a preferred construction, consisting of a cylinder surmounted by a spherical cap or dome, through the center of which the pipe E passes. Concentrically with said cylinder a second interior cylinder, open at the top and perforated at the sides in the lower part thereof, is firmly and tightly secured to the bottom of the receiver. The tube E penetrates centrally into the last-described cylinder, and terminates about the upper part thereof into a flare-mouth, to discharge the water and air or gases in a diffused stream, which, breaking against the perforated sides of the lower portion of the interior cylinder, will more readily liberate the aeriform from the liquid particles, which former will rise and collect in the dome of the chamber until it shall have collected sufficient to fill the whole capacity of the chamber, when it will be compressed to any given degree of compression by means of the water-discharge, which may be regulated accordingly.

I have represented in the drawing an automatic discharge consisting of a siphon, H, which is here shown in equilibrium, requiring but slight pressure to cause the flow of water; but it may be increased or decreased at pleasure. A purging-cock, J, is provided at the lower side of the chamber, and a connection with a suitable air or gas conductor is indicated at K.

Having thus fully described my said invention, I would observe that I do not confine myself to the application and uses of my said apparatus which I have hereinbefore indicated. They are too numerous to be enumerated; but I would briefly state that I deem my invention of great use in industrial pursuits as a means of compressing air and of promoting health in purifying it of all noxious gases which are generally discharged into the atmosphere of factories, mills, and other industrial works.

What I claim, and desire to secure by Letters Patent, is—

1. The herein-described method of conveying and compressing air, and of dissolving, condensing, and carrying off gases, vapors, &c., by the employment of a steam-blast in connection with water or other liquid.

2. The combination in one apparatus of a steam-injector, a surrounding water-chamber, and an intermediate air or gas chamber, substantially as set forth.

3. The combination, in an injecting apparatus, of steam, air, and water nozzles, the same being arranged successively or in superposed series, substantially as set forth.

4. The combination, with the triple steam, air, and water chamber and nozzles, of a combining-chamber, substantially as set forth.

5. The combination of the three-chambered injector for conveying steam, air, and water, as described, with a collecting-chamber or receiver, substantially as set forth.

6. The combination, with a steam-injector for mixing air or gases with water or other liquid, of a collecting-chamber or receiver having an automatic overflow at given pressures, substantially as set forth.

In testimony whereof I have signed this specification in the presence of two subscribing witnesses.

ISIDORE DREYFUS.

Witnesses:
W. ARROWSMITH,
W. W. THOMPSON.